United States Patent
Mooney

(10) Patent No.: US 9,969,641 B2
(45) Date of Patent: May 15, 2018

(54) SLUDGE DRYING BEDS

(71) Applicant: John Mooney, Roscrea (IE)

(72) Inventor: John Mooney, Roscrea (IE)

( * ) Notice: Subject to any disclaimer, the term of this patent is extended or adjusted under 35 U.S.C. 154(b) by 0 days. days.

(21) Appl. No.: 15/023,353

(22) PCT Filed: Feb. 14, 2014

(86) PCT No.: PCT/EP2014/052977
§ 371 (c)(1),
(2) Date: Mar. 18, 2016

(87) PCT Pub. No.: WO2015/039766
PCT Pub. Date: Mar. 26, 2015

(65) Prior Publication Data
US 2016/0244351 A1    Aug. 25, 2016

(30) Foreign Application Priority Data
Sep. 19, 2013  (IE) .................................. S2013/0282
Oct. 7, 2013  (GB) .................................. 1317712.6

(51) Int. Cl.
*C02F 11/16* (2006.01)
*B01D 21/24* (2006.01)

(52) U.S. Cl.
CPC .......... *C02F 11/16* (2013.01); *B01D 21/2444* (2013.01); *Y02W 10/37* (2015.05)

(58) Field of Classification Search
CPC ..... B01D 21/02; B01D 21/2444; C02F 11/12; C02F 11/16

(Continued)

(56) References Cited

U.S. PATENT DOCUMENTS

| 1,456,312 A | * | 5/1923 | Imhoff | .................... | C02F 11/16 |
| | | | | | 210/532.1 |
| 2,644,790 A | * | 7/1953 | Harper | .................... | C02F 11/16 |
| | | | | | 210/150 |

(Continued)

FOREIGN PATENT DOCUMENTS

| CN | 201842750 U | 5/2011 |
| GB | 1014244 A | 12/1965 |

OTHER PUBLICATIONS

International Search Report and Written Opinion dated Apr. 14, 2014, in corresponding International Application No. PCT/EP2014/052977, filed Feb. 14, 2014, 12 pages.

(Continued)

*Primary Examiner* — Christopher Upton
(74) *Attorney, Agent, or Firm* — Christensen O'Connor Johnson Kindness PLLC

(57) ABSTRACT

A sludge drying bed for effective separation or decanting of water from sludge and the storage of treated sludge comprising of a sloping floor (6,7) to drain the water towards the sluice door (2) located in the front wall, two side-walls and a valve controlled filler inlet pipe (9) at the back wall where the sludge enters the bed. The sludge drying bed is covered by an openable pitched roof utilizing a breathable, waterproof, black membrane as roof material for ventilation, heat absorption and surface water runoff. The sluice door (2) contains alternating plates to facilitate the filling of the sludge drying beds and the decanting of the water at multiple levels within the sludge, with a sump (3) located at the front wall to facilitate the efficient removal of the dried sludge from the beds. A telescopic handle, sludge drying bed cleaning tool is provided to facilitate the cleaning and maintenance of the sludge drying bed. The sludge drying beds are modular in design.

10 Claims, 2 Drawing Sheets

(58) Field of Classification Search
USPC .......... 210/609, 747.1, 800, 170.01, 170.08, 210/532.1, 536, 540
See application file for complete search history.

(56) References Cited

U.S. PATENT DOCUMENTS

| | | | | |
|---|---|---|---|---|
| 4,016,073 | A | * | 4/1977 | Jordan .................... C02F 11/16 210/170.09 |
| 4,382,863 | A | * | 5/1983 | Riise ....................... C02F 11/16 210/271 |
| 5,536,420 | A | | 7/1996 | Oyzboyd |
| 6,112,458 | A | * | 9/2000 | Pabsch .................... C02F 11/16 210/602 |
| 2012/0017461 | A1 | * | 1/2012 | Darcel .................... C02F 11/16 34/229 |
| 2014/0205497 | A1 | * | 7/2014 | Hammond .............. C02F 11/16 422/22 |

OTHER PUBLICATIONS

International Preliminary Report on Patentability dated Mar. 22, 2016, in corresponding International Application No. PCT/EP2014/052977, filed Feb. 14, 2014, 10 pages.

* cited by examiner

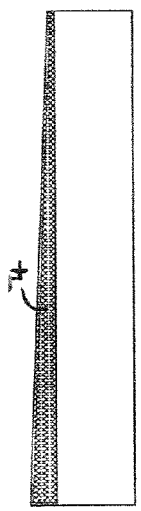
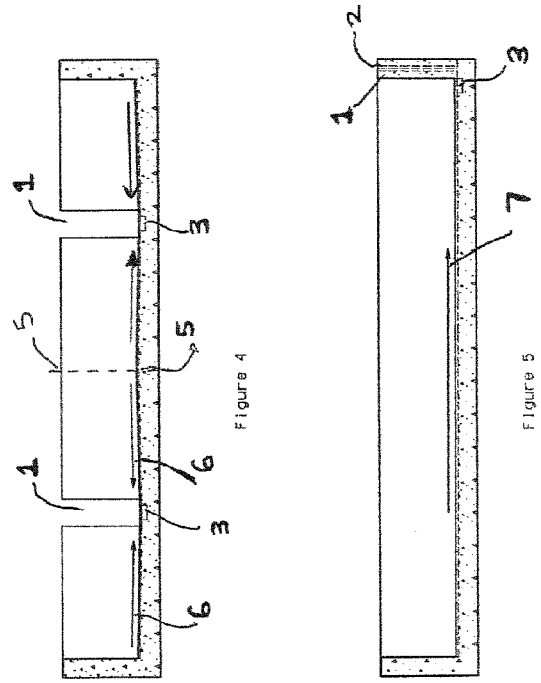
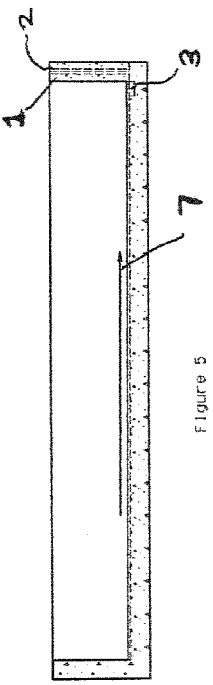
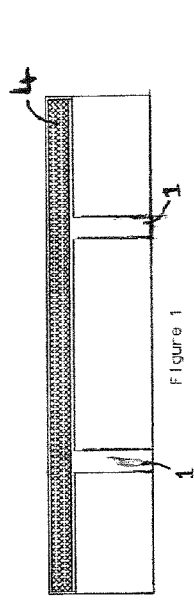
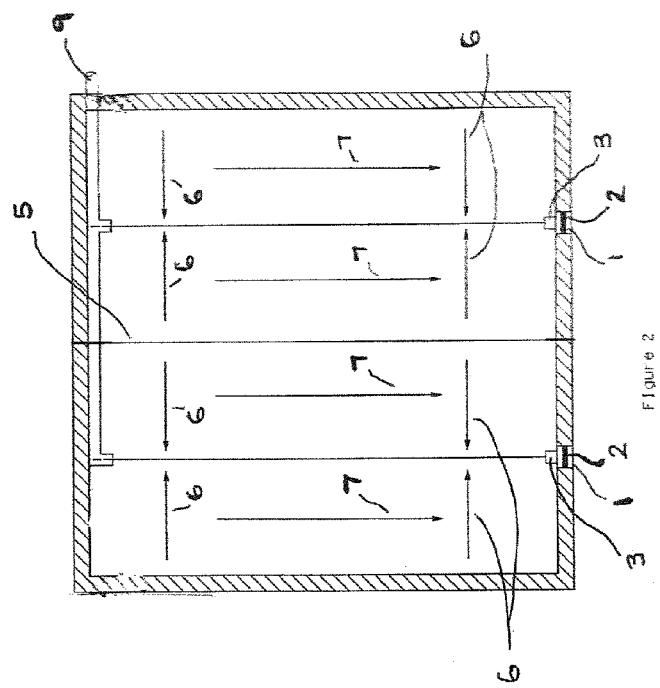

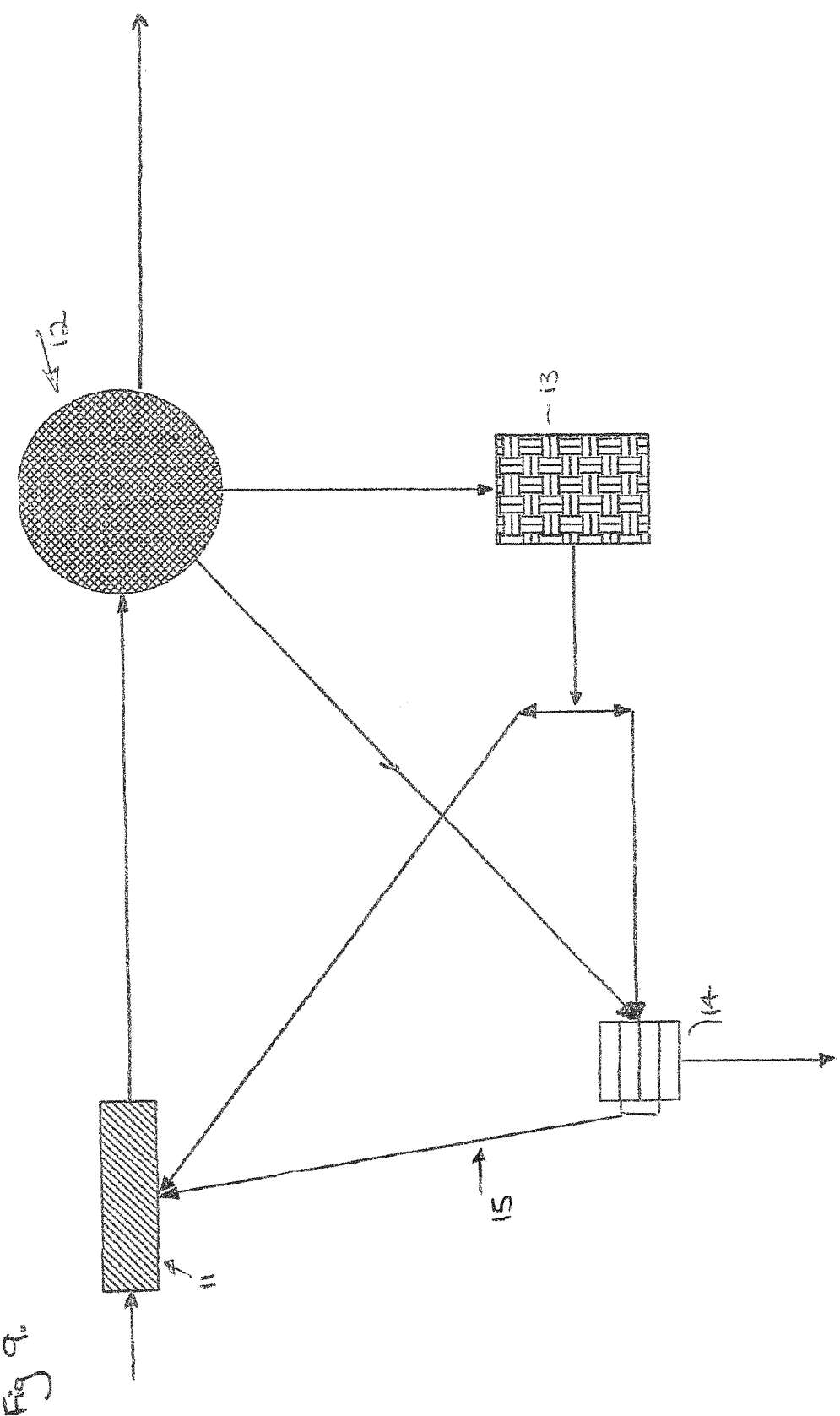

SLUDGE DRYING BEDS

The present invention relates to a process and apparatus for decanting water from sludge.

Domestic, commercial and industrial wastewater and sewage is transported through a collection system to a wastewater treatment plant. Wastewater treatment is a process of sanitising wastewater and household sewage by removing contaminants to produce an environmentally safe, treated effluent and solid waste (known as treated sludge), which can be safely disposed of or reused as fertiliser. A great deal of wastewater effluent is discharged into rivers and seas with a Licencing regime in place to regulate the amount and quality of effluent that may be so discharged.

The water is called influent before it enters one treatment step, and effluent when it emerges from that treatment step. The preliminary and primary treatment stages remove screenable (leaves, rags), floatable (oils and grease), and settleable (grit, food waste) materials from the influent wastewater. Secondary treatment involves the removal of organic matter and suspended material.

FIG. 9 illustrates the various processes in a typical treatment plant, whilst noting that there is no singular approach to best meet the needs of all cities, communities, and regions.

The aeration tank (or oxidation ditch) (11) takes large solids and floating debris from the raw sewage and the clarifier (12) removes sediment, turbidity (or haze) and floating material from raw sewage. Elevated levels of colour and turbidity may require large chemical addition during treatment, increasing sludge generation.

The treated sludge is then fed to sludge holding tanks before being transported by road to a larger wastewater treatment plant for further processing. The sludge is fed into separate sludge digestion tanks where compression of the sludge takes place. The sludge is then passed from the digestion tanks into decanters that operate at very high temperatures along with the addition of chemicals such as polymer to further remove liquid from the sludge in order to achieve higher average solid concentrations in the treated sludge.

The costs of handling the enormous quantities of sludge can account for a large percentage of the overall operating costs of water treatment works and are likely to increase due to increasingly stringent regulations. The cost and economics of current sludge transport/haulage are also significant.

In wastewater treatment plants, hydrolyzing metal salts and organic polymers added to coagulate suspended and dissolved contaminants to facilitate wastewater purification represents a significant part of the overall current treatment process cost and the coagulants form an integral part of the sludge produced thereby restricting its beneficial reuse value.

Because of the high energy, fuel and other resource requirements and costs associated with the current wastewater treatment plants there is a need for environmental sustainability and fiscal responsibility coupled with population increases will continually seeks alternative apparatuses and processes which offer both economic and environmental sustainability.

Referring now to the drawings and initially to FIG. 9, there is illustrated that the existing wastewater treatment plants may be retrofitted with the sludge drying bed(s) (14).

Sludge Drying Beds may be used for dewatering sludge well digested by means of either anaerobic or aerobic processes. The Sludge Drying Bed does not require any coagulants instead utilizing heat, gravitational forces and the sloping floor to dry the sludge resulting in significantly reduced operational costs of the wastewater treatment plants, a reduction in dried sludge volume and hence a reduction in transport and disposal costs.

The sludge drying beds offers great potential to increase plant treatment efficiency with two distinct advantages in terms of economic savings on overall treatment plant operation costs and environmental sustainability without compromising public health and safety.

Due to their low energy requirement and aesthetical appearance, the Sludge Drying Beds may be seen as a "green" wastewater treatment technique.

The scope of the sludge drying beds according to the present invention extends to cheaper and favourable alternatives to septic tanks and farm slurry pit replacements.

BRIEF SUMMARY OF THE INVENTION

The invention provides for a sludge drying bed comprising:
- (a) a floor which slopes downwards from the back wall to the front wall along the longitudinal axis of the bed and inwards from each of the side walls to a trough line centred along said longitudinal axis of the sludge drying bed,
- (b) a front wall, a back wall and two sidewalls,
- (c) an openable roof utilising a breathable, waterproof, black membrane as roof material fixed in two pitched metal frames so as to form a line of symmetry with respect to the longitudinal (or vertical) axis or optionally the perpendicular (to the longitudinal) axis with each frame sloping downwards from the centre to cover the entire surface area of the sludge drying bed,
- (d) means for introducing sludge into the sludge drying bed comprising a valve controlled inlet pipe,
- (e) means for allowing the discharge of water from the sludge comprising a sluice door, located in the front wall of the bed, containing slots for three interchangeable sluice door plates with one blank plate used when filling the bed and settling the sludge and the remaining two drainage plates each containing ten horizontal slots in the order of 3 mm which are spaced in the order of 75 mm apart with the first slot on one drainage plate positioned at approximately 25 mm from the bottom edge and the first slot on the other drainage plate positioned at approximately 65 mm from the bottom edge, and
- (f) a sump to the front of the sluice door located at the front wall.

BRIEF DESCRIPTION OF THE DRAWINGS

The invention will be better understood by reference to the following drawings, in which FIG. 1. illustrates an alternative embodiment of the present invention representing the front elevation of a modular array comprising of two sludge drying beds;

FIG. 2. illustrates a plan of a modular array comprising of two sludge drying beds.

FIG. 3. illustrates the side elevation of one half of the sludge drying bed;

FIG. 4. illustrates the transverse gradients on the floor of a modular array comprising of two sludge drying beds;

FIG. 5. illustrates the longitudinal gradient on the floor of the sludge drying bed;

FIG. 6 illustrates the sluice door solid blanking plate;

FIG. 7. illustrates the sluice door first interchangeable drainage plate;

FIG. 8. illustrates the sluice door second interchangeable drainage plates with horizontal slots;

FIG. 9 represents a schematic illustrating the workflow involved in a typical treatment of sludge waste and illustrates where the sludge drying bed(s) (14) would be incorporated into the wastewater treatment plant. The arrangement shown in FIG. 9 is only indicative of the types of wastewater treatment plant layouts in use.

DETAILED DESCRIPTION OF THE INVENTION

The design of the sludge drying bed provides for ease of operation and is determined by the treatment plant size. The sludge drying bed capacity is determined by such factors as: volume of sludge added, percent solids, and character; the temperature of the beds; the degree of solids reduction required; method of sludge disposal and the size of the plant. For operational purposes, the depth of the sludge placed on the drying bed may increase or decrease based on the percent solids content. Provision must be made to maintain sufficient continuity of service so that sludge may be dewatered without accumulation beyond the storage capacity of the beds.

The sludge drying beds are modular in design and may be scaled up by positioning the preferred embodiment of the sludge drying beds adjacent to each other, which may optionally be separated with or without a dividing wall, to cater for increased sludge volumes from domestic and commercial sewage and wastewater during the design life of the plant.

Referring now to the drawings and initially to FIGS. 1, 2 and 4 which represent an alternative embodiment of the present invention being that of the modular array of sludge drying beds.

FIG. 1 illustrates the sluice doors (1) and roof cover (4) as seen from the front elevation of a modular array of two sludge drying beds.

The arrangement in FIG. 2 illustrates two sludge drying beds in a modular array positioned adjacent to each other with an (optional) dividing wall (5) between each sludge drying bed.

FIG. 2. further illustrates the three plates (2) (one solid blanking plate and two drainage plates) contained in the sluice door slots as seen from the side elevation of a modular array of two sludge drying beds. FIG. 2 further illustrates the sump (3) located in front of the sluice door (1) and optional dividing wall (5) that may be constructed between the individual sludge drying beds in a modular array. Each singular sludge drying bed in an array contains one sump (3) and one sluice door (1).

FIG. 2. further illustrates the filler inlet pipe (9) that connects to the pumping/lifting station (see 13 of FIG. 9)—where the sludge is not gravity fed into the sludge drying bed—in the wastewater treatment system in the plant and sludge is fed into each bed consecutively in the modular arrangement of sludge drying beds.

Surface water runoff, heat absorption and ventilation of the sludge is facilitated by the use of an openable roof comprising of a breathable, waterproof, black membrane as roof material fixed in two pitched frames each frame sloping downwards towards the side walls or optionally sloping towards the front and back wall.

It is possible to freely open and shut the sludge drying bed pitched roof cover by means of the manual ratchet provided.

FIG. 3 illustrates the side elevation of one half of the sludge drying bed and shows one of the pitched (or inclined) frames sloping downwards towards the side wall (which may optionally slope towards the front and back walls also).

The floor of the sludge drying bed should have an adequate slope to allow the water to drain efficiently towards the sluice door (1).

FIG. 4 provides a schematic section of a modular array of two sludge drying beds, illustrating the transverse (perpendicular to the longitudinal) gradient (6) on the floor from the side walls of each of sludge drying bed to a trough line centred at each sluice door (1). The two sludge drying beds in a modular array may be separated by an optional dividing wall (5).

FIG. 5. provides the longitudinal gradient (7) on the floor of the sludge drying beds from the back to the front wall.

A particularly preferred embodiment of the sludge drying bed comprises of a rectangular tank of approximately 8000 mm long and approximately 3000 mm wide, with the four walls extending approximately 1000 mm high above the top of the sludge drying bed and the walls being at least 200 mm thickness, with the sluice door plates in the order of 1000 mm high, 280 mm wide and made from approximately 1.5 mm thickness stainless steel with one solid blanking plate and two drainage interchangeable plates each containing ten horizontal slots which should be spaced not more than 75 mm apart with the first slot on the one drainage plate positioned in the order of 25 mm above the bottom edge and the first slot on the other drainage plate positioned in the order of 65 mm above the bottom edge of the plate and with the sump (3) located to the front of the sluice door (1) and in the order of 150 mm long, 150 mm wide and 50 mm depth. The preferred longitudinal slope (7) being in the order of 30 mm and the preferred transverse slope (6) being in the order of 20 mm.

The floor and walls of the sludge drying bed are constructed from reinforced concrete. The concrete must be suitable for retaining waste products and should be of sufficient mechanical strength to contain the weight of the sludge. The walls of the drying beds should have a smooth finish with the concrete floor—containing embedded 16 mm reinforcing bars (rebar) set at approximately 500 mm centres—having a slighter rougher finish.

Simple, ease to use locks to facilitate access, service and maintenance of the openable roof and sluice doors of the sludge drying beds should be utilised.

During normal use the roof cover is closed. The roof cover is opened to facilitate the cleaning and maintenance of the sludge drying beds. A telescopic handle, sludge drying bed cleaning tool is provided to facilitate the cleaning and maintenance of the sludge drying beds.

Provision is made for the complete removal of all sludge from the sludge drying bed by (a) opening the openable pitched roof cover and (b) the construction of a sump to the front of the sluice door in the bed into which the sludge removal equipment may be inserted.

On-site storage of dewatered sludge should be limited to 150 days. Provisions for frequent disposal of dewatered sludge stored in the sludge drying beds should be made.

Provision can be made to protect against accidental overfill by fitting an overflow sensor to the wall of the sludge drying bed not less than 50 mm below the top of the wall which is connected back to the Pumping Station and which will shut the pump off upon the activation of the sensor.

The sludge drying bed should be situated in a secure and restricted access location. Special attention should be given to ensure adequate access to the areas adjacent to the walls of the sludge drying beds. Each bed shall be constructed so as to be readily and completely accessible to mechanical equipment for sludge removal and the cleaning and maintenance of the sludge drying beds.

All materials used in pipes and fittings in the sludge drying bed shall be suitable for purpose, suitably located or otherwise adequately protected to prevent freezing.

Wherever possible the sludge drying bed should be constructed partially underground to facilitate the introduction of the sludge into the bed by gravity alone thereby reducing energy costs; where the sludge drying bed is constructed at ground level it is recommended to use a pump to introduce the sludge into the bed.

The size of valve and piping should be at least 100 mm in diameter.

When filling the sludge drying bed and for the settling period of the sludge prior to the decanting of the water the sluice door is in the closed position utilising the solid blanking plate (see FIG. 6). After the sludge has been allowed settle or rest for a minimum of twelve hours the blanking plate is then removed (by sliding up in the vertical direction) from the sluice door resulting in the release of the water from the sludge through the horizontal slots in the drainage plate (see FIG. 7.) which is positioned directly behind the now removed blanking plate slot in the sluice door. At certain intervals the drainage plate (see FIG. 7.) is replaced with the second drainage plate (see FIG. 8.) to allow the release of water from multiple levels of the sludge contained in the sludge drying bed. The decanted water is recycled back to the aeration tank in treatment plant process (see 15 of FIG. 9).

Odour control in the sludge drying beds is facilitated by the combination of this breathable membrane roof cover and the gap between the top of the walls of the bed and the roof cover which both allow the methane gas and other gases to escape from the sludge drying beds.

The process of separating the water from sludge comprising of (a) charging the sludge drying bed(s) with sludge, (b) resting the sludge in the bed(s) for a minimum of twelve hours wherein the dewaterability and settleability of the sludge is enhanced by the three way sloped floor and the natural gravitational forces assisted by the heat energy absorbed into the sludge drying bed from sunlight via the black membrane rooftop and (c) the decanting of the water from the sludge, after the resting period, through the sluice door drainage plates positioned in the front wall of the sludge drying bed to be recycled back to the wastewater treatment plant result in a large increase in the mass of dry sludge solids obtained through using these sludge drying beds as distinct from the current methods.

There are two end products from the treatment process; sludge solids and liquid effluent. The sludge drying bed produces cleaner water, which is then recycled back to the Aeration Tank (see 11 of FIG. 9) and ultimately back to the river.

Sludge withdrawal to disposal ultimately in an incineration site takes place by inserting heavy pumping equipment into the sludge drying beds, which feeds the dried sludge back into vacuum trucks. The dried sludge may be utilised as a soil conditioner for agricultural, horticultural, or reclamation purposes.

As will be appreciated from the foregoing description, the modular, expandable capability of the sludge drying beds proves advantageous in that additional sludge drying bed may be constructed to facilitate increased or larger capacity waste water treatment plants as required.

The benefits of the sludge drying beds include, inter alia, high treatment efficiency, low operating costs, reduced energy consumption costs and transport fuel costs and cleaner water being ultimately discharged back into the river resulting in better local groundwater quality and safer usage and thereby minimising the adverse effects on the environment and helps to maintain the integrity of the soil ecosystem.

It is to be understood that the above-described embodiment is merely illustrative of some of the many specific embodiments that represent applications of the principles of the present invention. Clearly, numerous other arrangements can be readily devised by those skilled in the art without departing from the scope of the invention.

The invention claimed is:

1. A sludge drying bed comprising:
   (a) a floor which slopes downwards from the back wall to the front wall along the longitudinal axis of the bed and inwards from each of the side walls to a trough line centered along said longitudinal axis of the sludge drying bed;
   (b) a front wall, a back wall and two sidewalls;
   (c) an openable roof comprising a breathable, waterproof, black membrane cover fixed in two pitched frames, each frame sloping downwards towards the side walls or sloping towards the front and back wall;
   (d) means for introducing sludge into the sludge drying bed, comprising a valve controlled inlet pipe;
   (e) means for allowing the discharge of water from the sludge comprising a sluice door located in the front wall of the bed, containing slots for three interchangeable sluice door plates comprising one solid blanking plate used when filling the bed and settling the sludge and the remaining two drainage plates each containing ten horizontal slots; and
   (f) a sump in the floor of the sludge drying bed to the front of the sluice door.

2. The sludge drying bed according to claim 1, wherein dimensions range between
   (a) 7.5 meters to 9 meters in length from front to back;
   (b) between 2 meters to 4 meters in width;
   (c) between 0.5 and 1.5 meters in height from the floor of the bed;
   (d) with a slope being in the order of 30 mm from the back wall to the front wall and in the order of 20 mm from each of the side walls to a central halfway trough line; and
   (e) with horizontal slots openings in the two drainage plates in the sluice door in the order of 3 mm, said slots spaced in the order of 75 mm apart, with the first slot on one drainage plate positioned at approximately 25 mm from the bottom edge and the first slot on the other drainage plate positioned at approximately 65 mm from the bottom edge of the plate.

3. The sludge drying bed as claimed in either of claim 1 or 2, wherein it is positioned above ground.

4. The sludge drying bed as claimed in either of claim 1 or 2, wherein it is positioned below ground or partially below ground.

5. An expandable modular array comprising a plurality of sludge drying beds, which may be separated with or without a dividing wall and provide for the external appearance of a single sludge drying bed, wherein each sludge drying bed comprises:
   (a) a floor which slopes downwards from the back wall to the front wall along the longitudinal axis of the bed and inwards from each of the side walls to a trough line centered along said longitudinal axis of the sludge drying bed;
(b) a front wall, a back wall and two sidewalls;
(c) an openable roof comprising a breathable, waterproof, black membrane cover fixed in two pitched frames, each frame sloping downwards towards the side walls or sloping towards the front and back wall;
(d) means for introducing sludge into the sludge drying bed, comprising a valve controlled inlet pipe;
(e) means for allowing the discharge of water from the sludge comprising a sluice door located in the front wall of the bed, containing slots for three interchangeable sluice door plates comprising one solid blanking plate used when filling the bed and settling the sludge and the remaining two drainage plates each containing ten horizontal slots; and
(f) a sump in the floor of the sludge drying bed to the front of the sluice door.

6. The expandable modular array according to claim 5, wherein dimensions of each sludge drying bed range between
(a) 7.5 meters to 9 meters in length from front to back;
(b) between 2 meters to 4 meters in width;
(c) between 0.5 and 1.5 meters in height from the floor of the bed;
(d) with a slope being in the order of 30 mm from the back wall to the front wall and in the order of 20 mm from each of the side walls to a central halfway trough line; and
(e) with horizontal slots openings in the two drainage plates in the sluice door in the order of 3 mm, said slots spaced in the order of 75 mm apart, with the first slot on one drainage plate positioned at approximately 25 mm from the bottom edge and the first slot on the other drainage plate positioned at approximately 65 mm from the bottom edge of the plate.

7. The expandable modular array according to either of claim 5 or 6, wherein it is positioned above ground.

8. The expandable modular array according to either of claim 5 or 6, wherein it is positioned below ground or partially below ground.

9. A process for separating water from sludge, comprising the steps of:
(a) charging a sludge drying bed with sludge, wherein the sludge drying bed comprises:
(i) a floor which slopes downwards from the back wall to the front wall along the longitudinal axis of the bed and inwards from each of the side walls to a trough line centered along said longitudinal axis of the sludge drying bed,
(ii) a front wall, a back wall and two sidewalls,
(iii) an openable roof comprising a breathable, waterproof, black membrane cover fixed in two pitched frames, each frame sloping downwards towards the side walls or sloping towards the front and back wall,
(iv) means for introducing sludge into the sludge drying bed, comprising a valve controlled inlet pipe,
(v) means for allowing the discharge of water from the sludge comprising a sluice door located in the front wall of the bed, containing slots for three interchangeable sluice door plates comprising one solid blanking plate used when filling the bed and settling the sludge and the remaining two drainage plates each containing ten horizontal slots, and
(vi) a sump in the floor of the sludge drying bed to the front of the sluice door;
(b) resting the sludge in the bed for a minimum of twelve hours wherein the dewaterability and settleability of the sludge is enhanced by natural gravitational forces assisted by the heat energy absorbed into the sludge drying bed from sunlight via the black membrane rooftop and the floor which slopes downwards from the back wall to the front wall along the longitudinal axis of the bed and inwards from each of the side walls to a trough line centered along said longitudinal axis of the sludge drying bed; and
(c) decanting the water from the sludge, after the resting period, through the sluice door drainage plates positioned in the front wall of the sludge drying bed to be recycled back to the wastewater treatment plant.

10. The process according to claim 9, wherein dimensions of the sludge drying bed range between
(a) 7.5 meters to 9 meters in length from front to back;
(b) between 2 meters to 4 meters in width;
(c) between 0.5 and 1.5 meters in height from the floor of the bed;
(d) with a slope being in the order of 30 mm from the back wall to the front wall and in the order of 20 mm from each of the side walls to a central halfway trough line; and
(e) with horizontal slots openings in the two drainage plates in the sluice door in the order of 3 mm, said slots spaced in the order of 75 mm apart, with the first slot on one drainage plate positioned at approximately 25 mm from the bottom edge and the first slot on the other drainage plate positioned at approximately 65 mm from the bottom edge of the plate.

* * * * *